Figure 1:
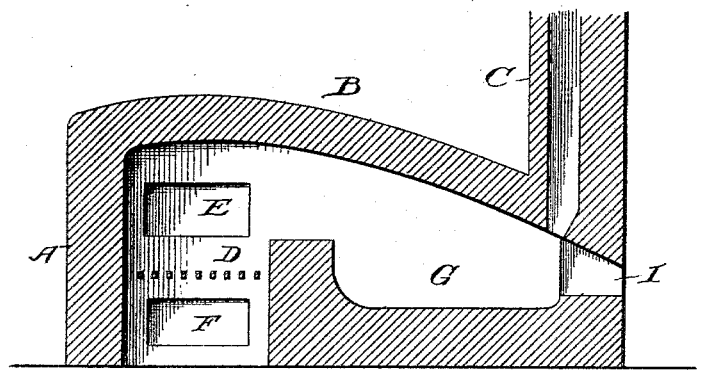

(No Model.)

F. R. CARPENTER.
ART OF SEPARATING AND REFINING METALS.

No. 597,139. Patented Jan. 11, 1898.

Witnesses
Edmund A. Strauss
E. A. Bullock

Inventor
Franklin R. Carpenter
By his Attorneys
Baldwin Davidson & Wight

UNITED STATES PATENT OFFICE.

FRANKLIN R. CARPENTER, OF DEADWOOD, SOUTH DAKOTA.

ART OF SEPARATING AND REFINING METALS.

SPECIFICATION forming part of Letters Patent No. 597,139, dated January 11, 1898.

Application filed December 19, 1896. Serial No. 616,338. (No specimens.)

*To all whom it may concern:*

Be it known that I, FRANKLIN R. CARPENTER, a citizen of the United States, residing at Deadwood, in the county of Lawrence and State of South Dakota, have invented certain new and useful Improvements in the Art of Concentrating, Separating, and Refining Precious Metals Contained in Metallic Copper, of which the following is a specification.

All methods now in use or which have heretofore been in use for the concentration of gold and silver in metallic copper and their separation from metallic copper and its compounds known to me are either imperfect or very expensive and require the highest technical skill. These objections apply to the ancient method of liquation as well as to the Augustin process, the Ziervogel process, the sulfuric-acid processes, or the yet more recent method of electrolysis. The first-named process provides for the saving of both gold and silver, but very imperfectly and at a very great expense, besides leaving the copper very impure. The Augustin and the Ziervogel processes, besides being expensive and requiring the highest technical skill, do not provide for the saving of the gold. The sulfuric-acid processes, besides presupposing a costly supply of sulfuric acid, which may not be obtainable in out-of-the-way localities, produce a by-product of the copper—viz., copper sulfate—which it is difficult to market. The electrolytic process requires an expensive plant and the highest technical skill, is very slow and ties up for long periods vast sums of money in the copper, gold, and silver while in the process of refining, and is entirely unsuited for smelting-works whose main business is the production of gold and silver and not copper, save as a by-product or as a means of collecting gold and silver.

Langguth's United States Patent No. 486,613, of November 22, 1892, relates to a process for bessemerizing a gold-and-silver-bearing-iron matte in a tilting converter through the successive stages of an enriched matte to an alloy of gold and silver (with iron) with the addition of lead, or an alloy of gold and silver with copper and the addition of lead, using a flux to slag off the baser metals.

The process above mentioned involves several impracticable and impossible metallurgical operations, it being impossible to bessemerize a pure-iron matte and obtain an alloy of iron with gold and silver, to which lead can be added, and do satisfactory work. It is likewise impossible to bessemerize iron matte with the small amount of copper that pyritic gold and silver ores usually contain and separate this small amount of resulting copper in the form of a button from the mass of iron slag formed in the process. It is likewise impossible to separate gold and silver bullion in its state of alloy with iron or copper by bessemerizing and produce satisfactory results. Again, bessemerizing matte containing lead involves such tremendous losses in precious metals as to be commercially impracticable.

Bessemerizing even low-grade gold-and-silver-bearing lead (Rösing's process) at its inherent low temperature involves such great loss of the precious metals as also to be commercially impracticable.

The use of lead is an essential step in Langguth's process in order to produce the best results, and, as above shown, renders his process impracticable, owing to the tremendous losses in the precious metals incident to bessemerizing any lead-bearing metal or metallic compound. The use of a flux is also essential to the Langguth process.

The object of my invention is to meet these various objections to existing processes, which end I attain by providing at small expense a simple and effective means of concentrating the precious metals in copper, leaving the bulk of the copper in a state from which it is easily reduced to metallic copper or in such a condition that it may be reused to collect a fresh load of gold and silver.

The class of works for which my process is particularly designed is not that class primarily engaged in copper-smelting, but that which makes use of copper to form a matte for the collection of gold and silver contained in ores which may or may not be free from copper. Hence should any gold and silver remain with the copper it is a matter of no moment, as in general the copper may be returned to the furnace, as hereinafter described.

My improved process is practically perfect for the concentration of gold and silver contained in large quantities of metallic copper and practically perfect for the separation of gold from the resulting concentrated copper and leaves the great bulk of the copper in such condition that merchantable copper can be readily produced from it after the great bulk of the precious metals which it contains has been removed.

In practicing my process the metallic copper carrying the precious metals is smelted in an oxidizing atmosphere acting on the surface of the molten metal. The temperature of the furnace is kept sufficiently high to keep the oxid of copper thus formed in the molten state, in which condition it may be withdrawn from the furnace with a rabble or flow directly therefrom, as copper oxid, or it may unite with silica derived from the sides of the furnace or from silica added to the bath and flow from the furnace or be otherwise withdrawn from it, as copper silicate or as a mixture of oxids and silicates. In any case the precious metals contained in the metallic copper, having a greater affinity for it than for the oxygen and not being stirred up during the operation, are concentrated and remain with the metallic copper beneath the oxids or silicates. As the operation proceeds I add more copper to replace that removed by oxidation until the resultant concentrated gold-silver-copper alloy is sufficiently enriched or until it is desired to terminate the operation, which may be done by continuing the oxidizing action until the resulting gold and silver are practically free from copper. The copper oxid or copper silicate or mixture of the two withdrawn from the furnace is readily reduced to metallic copper and sold as such or may be returned to the ore-smelting furnace to collect a fresh load of gold and silver.

So far as I am aware this process for the concentration of precious metals contained in a large bulk of metallic copper and concentrating the same into a small bulk of copper alloy and the final and complete separation of gold and silver therefrom by a cupeling or scorifying process, or both combined, is a new discovery. It will thus be seen that in my improved process I start simply with metallic copper carrying precious metals and cupel or scorify the metallic copper, forming cuprous oxid, which may or may not unite with silica, but which flows off or is drawn off in the liquid state from the surface of the bath, leaving practically all of the gold and most of the silver behind, concentrating it in a small bulk of gold-silver-copper alloy, which operation may be continued until a complete separation is made; but in general the concentrated alloy may be separated in other ways, the great advantage of the process being that the gold and silver have been cheaply separated from the great bulk of the metallic copper and have become at once available.

Figure 2:
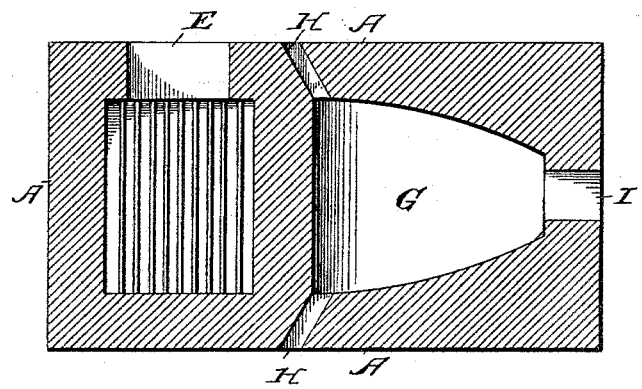

The accompanying drawings show a reverberatory furnace adapted for practicing my process, Figure 1 being a vertical longitudinal central section therethrough, and Fig. 2 a horizontal section therethrough just above the fire-grate.

This furnace involves no special novelty and is not herein claimed. The construction and operation of such a furnace, being well understood, require no particular description.

The drawings show the furnace as constructed with the ordinary side or casing walls A, dome or roof B, chimney C, fire-box D, fire-door E, ash-pit door F, hearth G, twyers H, and discharge or working door I, through which the cuprous oxids and silicates may be thrown off or withdrawn, as hereinbefore described.

What I claim herein as new and as of my own invention is—

1. The hereinbefore-described improvement in the art of concentrating the precious metals in, and separating them from metallic copper; which improvement consists in subjecting melted copper containing precious metals to an oxidizing atmosphere acting on its surface, thereby forming an oxid of copper, and discharging it in a liquid state from the furnace, leaving the precious metals behind.

2. The hereinbefore-described improvement in the art of concentrating the precious metals in, and separating them from metallic copper; which improvement consists in subjecting melted copper containing precious metals to an oxidizing atmosphere acting on its surface, in the presence of silica, and discharging the resulting silicate in a molten state from the furnace, leaving the precious metals behind.

In testimony whereof I have hereunto subscribed my name.

FRANKLIN R. CARPENTER.

Witnesses:
LLOYD B. WIGHT,
B. W. MILLER.